(12) United States Patent (10) Patent No.: US 7,996,750 B2
Wang et al. (45) Date of Patent: Aug. 9, 2011

(54) LIP SYNCHRONIZATION SYSTEM AND METHOD

(75) Inventors: David Wang, Richmond Hill (CA); Clarence Ip, Toronto (CA); Simpson Lam, Richmond Hill (CA)

(73) Assignee: Harris Canada Systems, Inc., Toronto (CA)

( * ) Notice: Subject to any disclaimer, the term of this patent is extended or adjusted under 35 U.S.C. 154(b) by 1038 days.

(21) Appl. No.: 11/688,283

(22) Filed: Mar. 20, 2007

(65) Prior Publication Data

US 2007/0245222 A1 Oct. 18, 2007

(30) Foreign Application Priority Data

Mar. 31, 2006 (CA) .................................... 2541560

(51) Int. Cl.
*G06F 11/00* (2006.01)
(52) U.S. Cl. ........ 714/798; 348/515; 348/579; 348/572; 348/525; 348/513
(58) Field of Classification Search .................. 714/798; 348/515, 579, 572, 525, 513
See application file for complete search history.

(56) References Cited

U.S. PATENT DOCUMENTS

| 2001/0043202 | A1* | 11/2001 | Choi .............................. | 345/204 |
| 2003/0053000 | A1* | 3/2003 | Testin et al. .................... | 348/565 |
| 2005/0104895 | A1* | 5/2005 | Kiyama et al. ................. | 345/600 |
| 2005/0212970 | A1* | 9/2005 | Joskin ............................ | 348/572 |
| 2006/0130121 | A1* | 6/2006 | Candelore et al. ............. | 725/145 |
| 2007/0126929 | A1* | 6/2007 | Han et al. ....................... | 348/515 |
| 2007/0147553 | A1* | 6/2007 | Bhat et al. ..................... | 375/345 |

FOREIGN PATENT DOCUMENTS

| EP | 0 895 427 | 2/1999 |
| WO | WO 00/05901 | 2/2000 |
| WO | WO 2005/004470 | 1/2005 |
| WO | WO 2005/099251 | 10/2005 |
| WO | WO 2006/006980 | 1/2006 |

OTHER PUBLICATIONS

International Search Report for International Application No. PCT/CA2007/000480, Date of Mailing Jul. 18, 2007 (3 pages).
Written Opinion of International Searching Authority for PCT Application No. PCT/CA2007/000480, Date of Mailing Jul. 18, 2007 (4 pages).
Supplementary European Search Report and European Search Opinion for International Application No. PCT/CA2007/000480, Date of Mailing Jul. 9, 2009 (6 pages).

* cited by examiner

*Primary Examiner* — Guy J Lamarre
(74) *Attorney, Agent, or Firm* — Tarolli, Sundheim, Covell & Tummino LLP

(57) ABSTRACT

A system and method for correcting so-called "lip sync" errors is provided, using a synchronization test signal comprising a video signal including a colorbar signal that is periodically interrupted by a series of consecutive defined black frames and an audio signal comprising a tone periodically interrupted by a period of silence beginning at the same time as the first of the series of consecutive defined black frames. The synchronization test signal is configured to survive encoding, decoding, conversion, and compressing processes used in a typical digital broadcast system environment and thus provide a means of measuring the relative audio and video timing of a processed signal. A method for correcting lip sync error receiving the synchronization test signal and comparing the relative timing of the video and audio portions of the synchronization test signal to their original relative timing, and delaying either the audio or video portions of a broadcast signal according to the timing comparison derived from the received test signal.

20 Claims, 3 Drawing Sheets

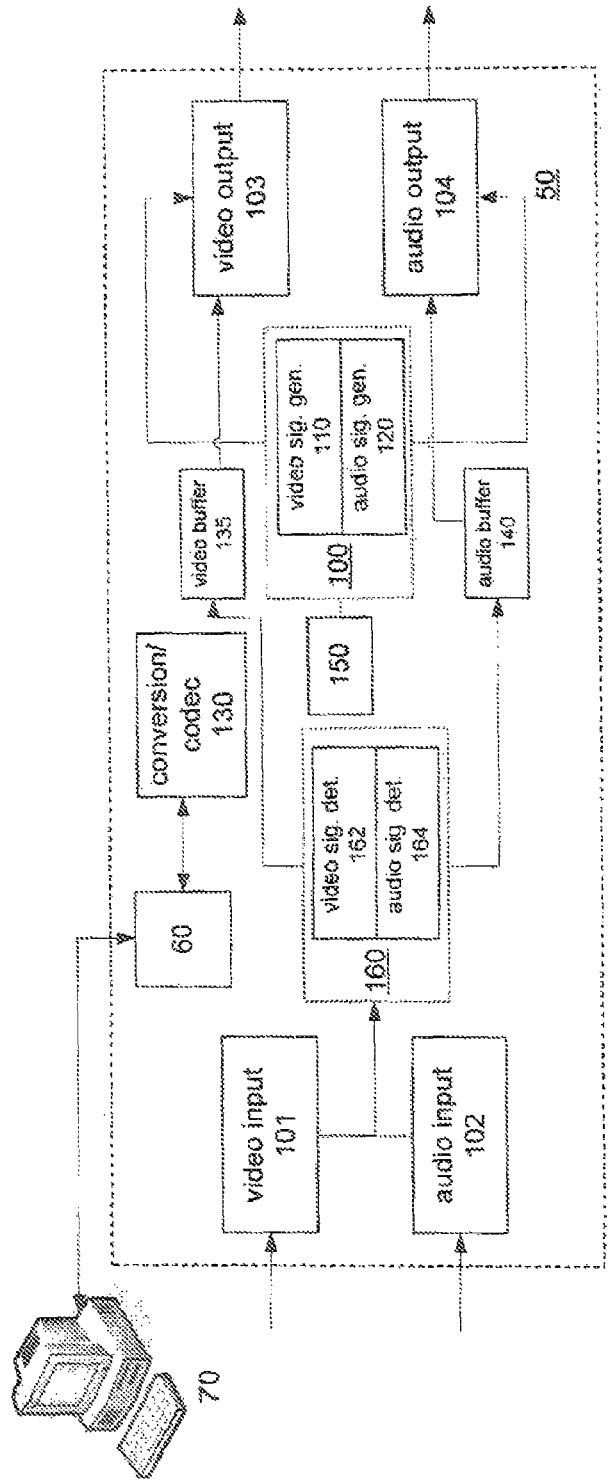
Figure 1a
Figure 1b

LIP SYNCHRONIZATION SYSTEM AND METHOD

FIELD OF THE INVENTION

The present invention relates generally the field of lip synchronization, and in particular to a system for measuring and correcting a time differential between an audio and a video signal.

TECHNICAL BACKGROUND

When a broadcast signal is reproduced, converted from a source format to an output format, or otherwise processed, the timing of the video portion of the signal may deviate from the timing of the audio signal unless care is taken to maintain the audio and video in synchronization. The resultant differential is often referred to as a "lip sync" error, as the viewer of the broadcast signal often detects the timing differential when the broadcast signal contains a representation of a person speaking; the sound of the spoken words is no longer in "sync" with the speaker's lip movement. This problem is experienced not only in consumer devices, but also in commercial broadcast signal processing equipment. Generally, it is desirable to reduce, if not eliminate, lip sync errors because they detract from the viewer experience. Reduction of lip sync error is usually accomplished by delaying the audio signal by a predetermined amount, as the video signal lags behind the audio signal. Under certain processing conditions, the audio may lag the video signal, so the video signal would then have to be delayed.

Previously, methods for reducing the timing error between the audio and video portions of a signal have included manual adjustment based on a delay factor determined by observation by an operator, or automatic adjustment based on a previously determined delay factor. The disadvantage of a manual measurement and adjustment is that it is based on a human-perceived delay; because individuals may have different perceptual thresholds with respect to lip sync error, a manually-determined correction may be not adequate. Prior art methods of automatically delaying the audio by a predetermined factor typically employed an arbitrary delay factor, based on the expected delay in the video signal during processing. This is an inadequate solution because the audio and video signals may be routed through a number of devices or may undergo a number of processing steps that were unknown at the time the arbitrary factor was determined. Each additional device or step may impact the ultimate lip sync error. In particular, when a broadcast signal is processed using a multifunction device, which may provide for multiple signal paths and conversion between a multiplicity of broadcast signal formats, the delay factor may not be predictable. Other prior art methods of detecting a lip sync error included the insertion of a video signal in sync with an audio "pip" (a machine-perceptible signal), and detecting the video and audio signals; however, these prior art methods require specialized equipment and moreover the lip sync detection signals cannot survive the demands of digital broadcast signal processing.

It is therefore desirable to provide a system and method for measuring lip sync error in a signal path that does not require specialized equipment. It is further desirable to provide a lip sync error test signal that is robust enough to survive the rigours of a digital broadcast environment that includes up-, down-, and cross-conversion between formats, analog to digital and digital to analog conversion, as well as compression.

BRIEF DESCRIPTION OF THE DRAWINGS

In accordance with a preferred embodiment of the invention,

FIG. 1a is a high-level block diagram of a multipath, multifunction broadcast signal processor implementing a lip synchronization test signal generator and detector.

FIG. 1b is a high-level block diagram of a lip sync error correction system comprising two processors of FIG. 1a.

DETAILED DESCRIPTION

Figure 2:
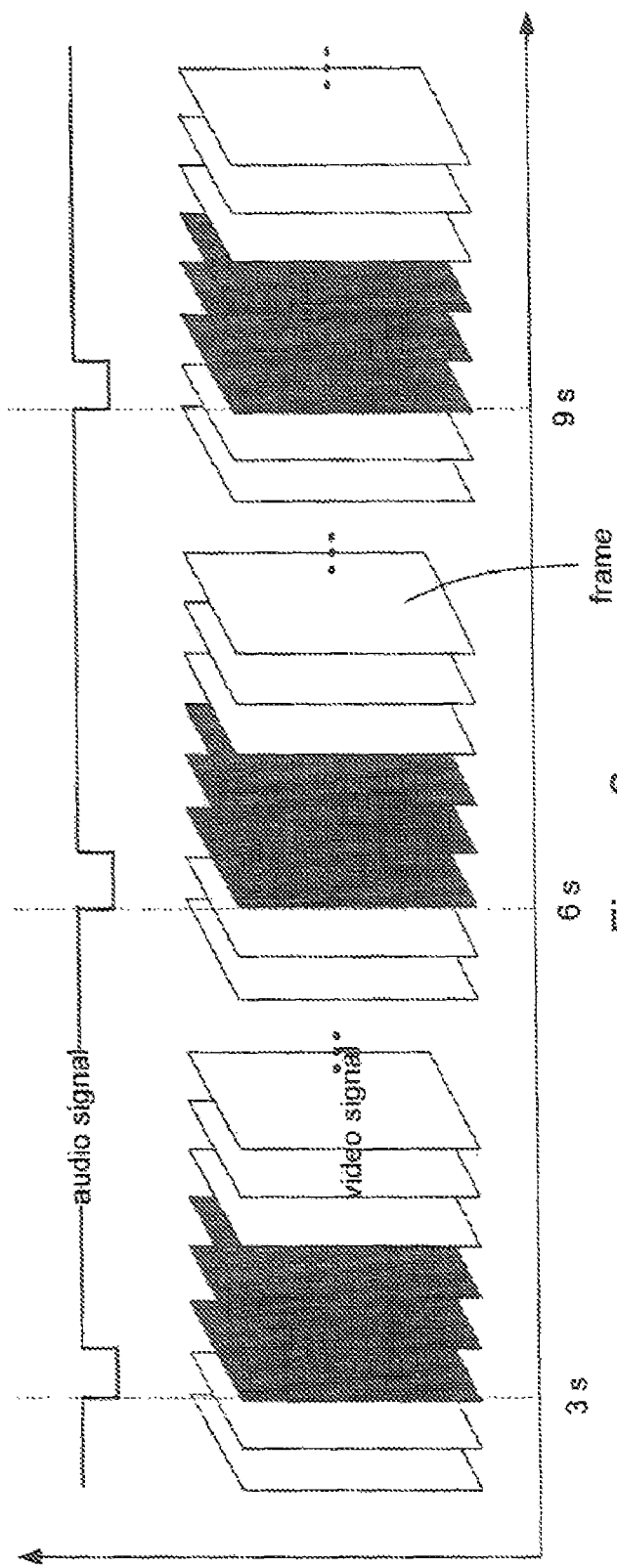
FIG. 2 is a time-based, schematic diagram of a lip sync test signal.

Accordingly, there is provided a synchronization test signal, comprising a video signal comprising a non-black signal interrupted by a blackout period; and an audio signal comprising a tone interrupted by a mute period synchronized with the blackout period.

There is also provided a synchronization test signal, comprising a video signal comprising a non-black signal periodically interrupted by a blackout period; and an audio signal comprising a tone periodically interrupted by a mute period synchronized with the blackout period.

In another aspect, there is also provided a system for measuring an induced time differential between a video and audio signal, comprising a synchronization test signal generator for generating the synchronization test signal described above; an output for transmitting the synchronization test signal to a broadcast system or network; and a detection module for receiving the synchronization test signal from the broadcast system or network and for detecting the non-black signal and the tone and for measuring an induced time differential between the non-black signal and the tone. There is also provided a system for measuring an induced time differential between a video and audio signal, in which the detection module is configured to receive the synchronization test signal from the broadcast system or network and to detect the blackout period and the mute period and to measure an induced time differential between the blackout period and the mute period.

There is also provided a method for measuring an induced time differential between a video and audio signal, comprising the steps of: generating the synchronization test signal described above; passing the synchronization test signal through a transmission system; receiving the synchronization test signal; comparing the relative timing of the blackout period and the mute period in the received synchronization test signal to determine the induced time differential. In another embodiment, the step of comparing is the step of comparing the relative timing of the non-black signal and the tone in the received synchronization test signal to determine the induced time differential.

The present invention is described in the context of a multifunction broadcast signal processor that provides processing functionality for both analog and digital broadcast signals, but it will be appreciated by a person skilled in the art that the present invention may be implemented in a number of operative environments including both digital and analog television studios, hybrid facilities, and single-format video production environments, such as a purely high definition television (HDTV) environment or a serial digital interface (SDI) environment. The invention as described below may equally be implemented in a separate processing device.

Referring to FIG. 1a, broadcast signal source, which may comprise a camera and/or microphone, a live broadcast feed, or other audio/video source such as a videotape, disc, or other data storage unit, feeds audio and video information to a processor 50 implementing a lip sync test signal generator and detector via one more inputs 101 and 102, representing video and audio inputs, respectively.

The processor 50 preferably provides standard definition broadcast signal processing and HDTV conversion, with the ability to up-convert, down-convert, and cross-convert from most input video formats to most output video formats. Preferably, the processor 50 is provided with a number of input connections 101 and 102 and a number of output connections 103 and 104, compatible with such video formats as optical fiber HDTV, coaxial cable HDTV, SDI, analog video (Betacam(R)), S-video, and RGB-S, NTSC, PAL-M, PAL-B, and SECAM composite inputs, Ethernet for streaming thumbnails, DVI-D, and the like, as well as with analog and digital audio signals. The processor 50 is preferably configured to bridge any of the foregoing input formats with any of the output formats.

The user interface 60, which may be provided on the processor unit 50 itself or preferably via a wired or wireless network connection to a personal computer or other input device 70, provides for manual and automatic control over the functions of the processor 50, for example for configuring bridging between any input format and any output format, and further provides user control over standard video and audio processing and editing functions known and implemented in the art carried out by the processor 50, including colour and hue control, noise reduction, analog-to-digital conversion, digital-to-analog conversion, frame synchronization, time base correction, up/down conversion, cross-conversion, decompression and processing of embedded audio signals such as Dolby E® and AC-3®, voice-over, and other functions typically required in broadcast signal processing. Preferably the processor 50 is also capable of converting any embedded metadata, such as closed captioning, as required during any up/down/cross-conversion process. These functions may be implemented as appropriate in either software or hardware, and the components configured to provide this functionality are generally known in the art and indicated as the conversion/codec module 130. The audio and video signals are typically processed separately by the module 130 as the conversion, encoding, and decoding processes for audio and video signals are different.

In the preferred embodiment, the processor 50 comprises a lip sync test signal generator 100 comprising a video test signal generator 110 and an audio test signal generator 120. The video test signal generator 110 is configured to inject a video test pattern into the video signal path within the processor 50, including colourbars at 100% level and lower levels, such as 75%, in accordance with the format defined by the Society of Motion Picture and Television Engineers (SMPTE), as well as other standard and user-customized test patterns. The audio test signal generator 120 is configured to generate constant or periodic tones at predetermined or user-customizable frequencies along the audio signal path within the processor 50.

The processor 50 is further provided with means for introducing a delay into the audio signal, using techniques known in the art. One preferred means comprises an audio data buffer 140 for storing audio data and reproducing the audio data for output through the audio output 104 in response to a timing signal. In a further preferred embodiment, the processor 50 also comprises a video data buffer 135 for storing video data and reproducing this data for output through the video output 103 in response to a timing signal. The processor 50 also comprises a timing source, which may be an internal source 150 or an external source (not shown). These buffers 135, 140 may comprise other functional blocks or means for inducing a delay into the video or audio signal before output via outputs 103 and 104, but in the preferred embodiment digital video and audio information is buffered. If no delay is necessary in the video and/or audio signal, the signals may be routed directly to the outputs 103, 104 from the detection module 160, described below (connection not shown).

Interposed in the video and audio signal paths between the inputs 101, 102 and the outputs 103, 104, preferably between the inputs 101, 102 and the buffers 135, 140, is a detection module 160, which preferably receives the video and audio signals from the inputs 101, 102. The detection module 160 comprises a video signal detection block 162 and an audio signal detection block 164, which scan the video and audio signals respectively for a lip sync test signal, as described below, and determines what delay factor should be introduced into the audio or the video signal in order to correct a timing error.

In the preferred embodiment, the video test signal generator 110 is configurable, most preferably via the user interface 60, to provide a video signal consisting of a constant non-black signal, periodically interrupted with a blackout period comprising at least one blackout frame or a series of consecutive blackout frames. A blackout frame in the preferred embodiment is a video frame comprising at least one line in the active video that consists of a sufficient black signal to be defined at the detection module 160 as "black". For example, excluding 5% from the beginning and the end of the active portion of the line, the remaining active portion of the line preferably consists of a black signal, within a tolerance of 5% to allow for noise introduced into the signal before reception at the detection module 160. While a single defined black line in a frame is sufficient for a blackout frame, in other embodiments several lines may be set to black; for example, a blackout frame may be defined to be a frame in which at least 75% of every line in the active portion of the video signal may be black, within a tolerance of 5%. The non-black signal, conversely, is a video signal that does not contain the defined black line in the active portion of the signal. More preferably, the non-black signal comprises a video signal in which each line in the active portion of the signal is no more than 50% black, and the remainder of each line in the active portion consists of a colour signal with an intensity of at least 75% of the full amplitude of the signal. In the most preferred embodiment, the non-black signal supplied by the video test signal generator 110 is a full (100%) intensity SMPTE colourbar test signal. In the preferred embodiment, video test signal generator 110 produces a signal periodically sequencing a series of frames of the non-black signal with a series of consecutive blackout frames. Most preferably, a blackout period is inserted at three-second intervals into the non-black signal, and the blackout period has a duration of at least two frames. Thus, the blackout period consists of a series of at least two consecutive blackout frames. The schematic representation of the video signal in FIG. 2 depicts a blackout period of three consecutive frames at an insertion frequency of 3 Hz. Most preferably, however, a series of six consecutive blackout frames is used. The video portion of the lip sync test signal may comprise a longer video blackout period, as long as at least one video frame, and most preferably at least two video frames, within one interval comprise the non-black signal.

The audio test signal generator 120 is configurable to provide a tone at a fixed frequency within the range of 20 Hz to 20,000 Hz, with periodic mute periods synchronized with the blackout frame insertions into the signal generated by the video test signal generator. Thus, for example, if the series of consecutive blackout frames is inserted every 3 seconds into the non-black video signal, then the mute periods are inserted every 3 seconds as well. Most preferably, the insertion of the audio mute periods is timed to correspond with the insertion of the blackout frames into the video signal, as shown in the example of FIG. 2, although it is not necessary provided the temporal correlation between the mute periods and the blackout frames is known. In FIG. 2, it can be seen that the audio mute periods begin at the same time as the first of the series of consecutive blackout frames (shaded frames in FIG. 2). Most preferably, a mute period of the same duration of a single video frame is used. Thus, for example, in most digital television environments, the audio mute period will have a duration of approximately 30 to 45 milliseconds. The mute period will have longer duration, provided that the period of the tone within each interval is at least the duration of a single video frame.

The timing of the video and audio test signal generator 110, 120 is preferably controlled by a single timing source, such as the internal timing source 150. Together, this video signal and audio signal provide a lip sync test signal. Most preferably, the test signal generators 110, 120 are configured to output test signals in both analog and digital formats. The lip sync test signal is thus robust, as it is capable of surviving any encoding, decoding, compression, decompression, or conversion of the video or the audio data in a typical network or broadcast distribution configuration, and will not be cut or eliminated by modern compression techniques, which typically strip out superfluous data or subliminal signals. The lip sync test signal provided here, for example, provides an advantage over watermarking or blanking interval techniques, in which extra data is inserted into the vertical blanking interval. Such extra data is often removed when the video is encoded using an MPEG standard, and so cannot be used to measure a lip sync error introduced by MPEG encoding.

Figure 3:
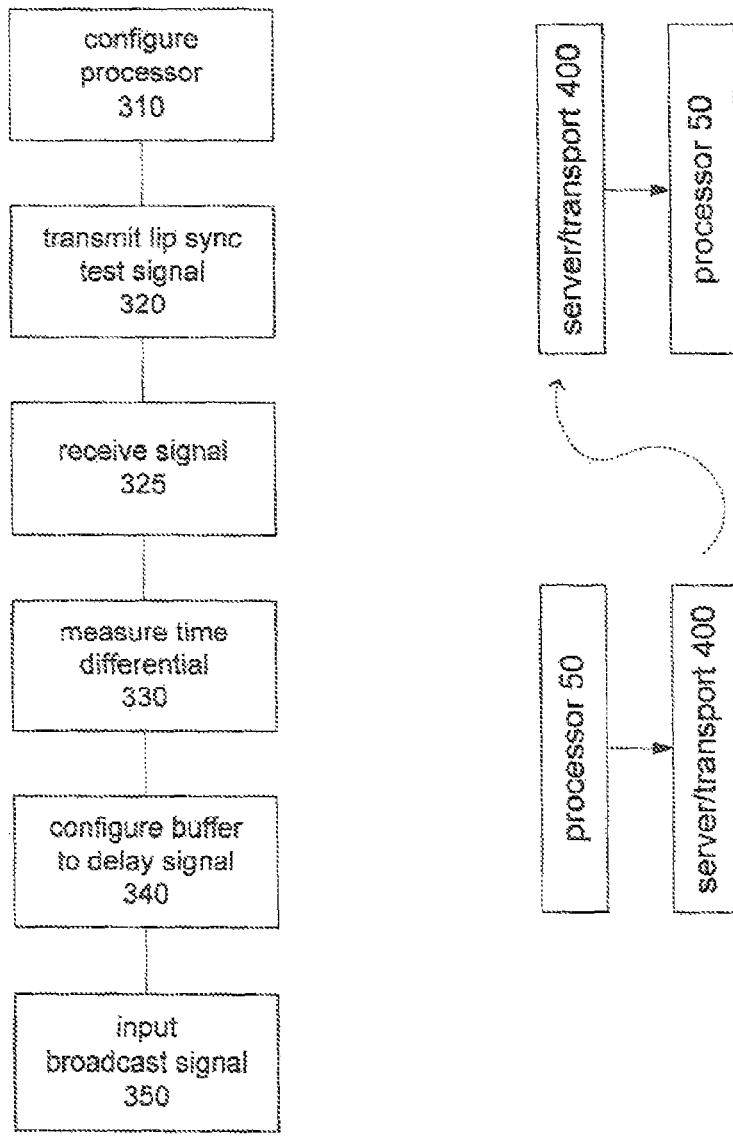
FIG. 3 is a block diagram of a method for correcting so-called lip sync errors.

With reference to FIGS. 1b and 3, to measure a timing or "lip sync" error in a given network configuration or transmission system 500 before processing a broadcast signal from a source 20, a user would configure the network configuration or transmission system 500 for processing the broadcast signal at step 310. The network or system could comprise up-conversion from SDTV to HDTV, Dolby E encoding, and MPEG compression. The paths may alternatively comprise digital to analog or analog to digital compression, or could pass through analog video and audio signals without converting them to a digital format. The user would then configure a first processor 50a to enter a test mode to measure lip sync error. In this test mode, the video and audio test signal generators 110, 120 (not shown) in the first processor 50a would be configured to generate the lip sync test signal, as described above, and to transmit this signal through the system or network 500 at step 320. The lip sync test signal is received by a second processor 50b at step 325, such that the signal is detected by the detection module 160 of the second processor 50b (not shown). Upon reception by the second processor 50b, the video signal of the lip sync test signal may lag the audio signal (typical lip sync error), as can be determined by the time differential between the detection of an audio silent period and the blackout period in the video. This time differential, which comprises the lip sync error, is measured at step 330. The detector 160 scans the audio signal for a mute period, and identifies the time index for that mute period; the detector 160 also scans the video signal for a blackout frame, and identifies the time index associated with that blackout frame. The time differential is the difference in the time indices thus identified. There may be circumstances where the audio signal lags behind the video signal; the detector 160 of the second processor 50b may be configured to measure this time differential as well. Preferably, the detector 160 provides a time differential measurement whether the audio signal lags or leads the video signal.

If, in the lip sync test signal, the beginning of the mute period and the blackout period were synchronized such that neither lagged nor led the other at the generator 100, then the time differential measured by the detection module 160 would preferably be the time difference between the detected beginning of the mute period and the blackout period at the detection module 160. If the mute period and the blackout period were otherwise synchronized such that the beginnings of those periods did not coincide but were otherwise temporally correlated (for example, the mute period might be configured to lag the blackout period by a fixed number of frames), then preferably the time differential measured by the detection module 160 would be the time difference between the temporal correlation between the mute period and the blackout period measured by the detection module 160 and the original temporal correlation between the mute period and the blackout period at the generator 100. If the mute period and the blackout period were synchronized in a manner such that the beginning of those periods did not coincide, then preferably the detection module 160 would be configured with means to store information about the original temporaal correlation between the mute period and the blackout period, for example in an integrated circuit memory element, so that this information was available to the detection module 160 for determination of a time differential. In an alternative embodiment, the lip sync test signal itself may be programmed with data regarding the lag between the mute period and the blackout period, or vice versa, preferably by inserting a code or signal into the active portion of the video or audio signal, or by altering the non-black signal or tone; the detection module 160 would then be configured to detect this further code or signal, and to correlate this code or signal with timing information in order to determine the time differential. This embodiment is less desirable, as it adds to the complexity of the lip sync test signal.

The time differential measurement may be accomplished fairly quickly, provided one full period (3 seconds in the preferred embodiment) of the lip sync test signal is received by the detector 160. Thus, the lip sync error may be measured within about five seconds of the engagement of the video and audio test signal processors 110, 120 at step 320. Thus, in one embodiment, the lip sync test signal may comprise a non-black video signal interrupted by one blackout period and an audio tone interrupted by one mute period, rather a video and audio signal interrupted by periodic blackout periods and mute periods, respectively. In an alternate embodiment, the detector 160 may take several measurements of the lip sync test signal in order to determine an average lip sync error.

In still a further embodiment, the detector 160 may scan the video signal for the non-black signal, and the audio signal for the tone. If the generator 100 is configured to produce a signal having the non-black signal and the tone commence at the same time index, then the time differential measured by the detection module 160 is preferably the time difference between the detected beginning of the tone and the beginning of the non-black signal. Otherwise, the time differential measured by the detection module 160 would preferably be the time difference between the temporal correlation between the beginning of the tone and the beginning of the non-black signal measured by the detection module 160 and the original temporal correlation between the audio tone and the non-black signal at the generator 100. Similarly, in a still further embodiment the detector 160 may scan the video signal for the non-black signal, and the audio signal for the mute period, or the video signal for the blackout period and the audio signal for the tone, with similar considerations given to the temporal correlations between these periods and signals.

In a most preferred embodiment, the detector 160, having determined the time differential, provides this data to the audio or video data buffer 140 or 135 (not shown) of the second processor 50b. The buffer 140 or 135 is then configured to introduce a delay equal to the time differential at step 340 in order to equalize the timing of the video and audio signals. If the video signal is determined to be lagging the audio signal, then the audio buffer 140 will be configured to delay the audio signal. Once the buffer 140 or 135 is configured, the first processor 50a may be removed and the broadcast signal from the source 20 may be provided directly to the receiving processor 50b at step 350; alternatively, the first processor 50a may be left in communication with the source 20 and the network 500, but simply operate as a pass-through.

Figure 4:
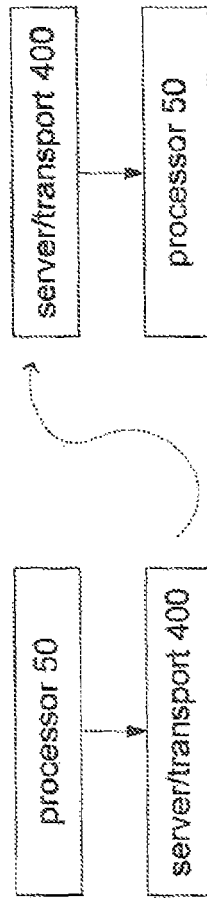
FIG. 4 is a schematic representation of a system for measuring so-called lip sync error using a recording of the lip sync test signal.

Referring to FIG. 4, the lip sync error may be measured and corrected using a single processor 50. The lip sync test signal is output directly from the test signal generators 110, 120 in the processor 50 to the server or transport 400. The recorded lip sync test signal is then taken to a network connection or transmission system and played back through the connection or system to be received by another or the same processor 50, where any time differential between the audio and video portions of the lip sync test signal is detected and measured. Alternatively, the lip sync test signal and the system described above may be used to evaluate the relative video to audio timing of a storage device or record/playback transport, such as a file server or tape transport.

Figure 5:
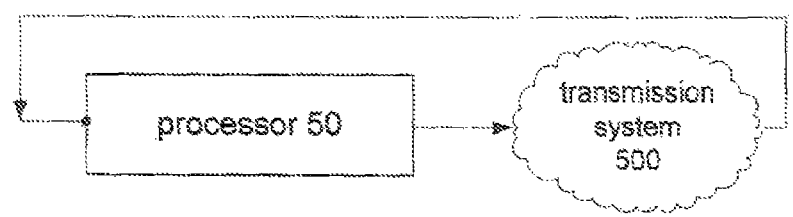
FIG. 5 is a schematic representation of a system for measuring so-called lip sync error in a transmission system.

Similarly, with reference to FIG. 5, a single processor 50 may use the lip sync test signal to evaluate the relative video to audio timing of an external transmission system 500, which may comprise external processors, network connections, and further transmitters and receivers. The transmission system 500 is looped back to the input of the processor 50, which is configured to pass the received signal directly back to the detection module 160. The lip sync test signal is sent to the transmission system 500, and received ultimately by the detection module 160, which can then determine any time differential between the audio and video portions of the lip sync test signal caused by the transmission system 500.

It will be appreciated that some or all of the signal processing circuitry or software may be contained within the same module 130, including the test signal generators 110, 120 and the detection module 160, or that alternatively the processor 50 may not comprise a module 130 for encoding/decoding, conversion or compression, and may function only as a lip sync test signal generator and lip sync error detection and correction unit with the signal generators 110, 120, detection module 160 and buffers 135, 140. In a further embodiment, persons skilled in the art will appreciate that a lip sync error correction processor unit may comprise only the detection module 160 and the buffers 135, 140, with suitable inputs and outputs and timing blocks, to function as a lip sync error detection and correction unit, while a separate lip sync signal generator unit may comprise suitable inputs, outputs, and the lip sync signal generator 100 without the detection module 160.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A synchronization test signal generator configured to generate a test signal, the test signal generator comprising:
   a video signal generator configured to generate a video signal comprising a non-black signal interrupted by a blackout period, the non-black signal comprising at least one non-black line of video and the blackout period comprising at least one blackout frame; and
   an audio signal generator configured to generate an audio signal comprising a tone comprising interrupted by a mute period that is synchronized with the blackout period, the test signal comprising the video signal and the audio signal.

2. The test signal generator of claim 1, wherein the non-black signal is periodically interrupted by the blackout period; and
   wherein the tone is periodically interrupted by the mute period.

3. The test signal generator of claim 1, wherein the blackout period further comprises at least one blackout frame.

4. The test signal generator of claim 3, wherein the blackout period further comprises a series of at least two consecutive blackout frames.

5. The test signal generator of claim 3, wherein the mute period is inserted into the audio signal at a time that corresponds to insertion of the at least one blackout frame.

6. The test signal generator of claim 3, wherein the mute period is inserted into the audio signal at a time having a known time correlation relative, to insertion of the at least one blackout frame.

7. The test signal generator of claim 1, wherein the at least one blackout frame comprises a black signal in at least one line of an active portion of the video signal.

8. The test signal generator of claim 1, wherein the at least one non-black line of video further comprises a video signal in which each line in the active portion of the signal is no more than 50% black, and the remainder of each line in the active portion consists of a color signal with an intensity of at least 75% of a full amplitude of the video signal.

9. A system for measuring an induced time differential between a video and audio signal, comprising:
   a synchronization test signal generator for generating it synchronization test signal, the synchronization test signal comprising:
      a video signal comprising a non-black signal interrupted by a blackout period, the non-black signal comprising at least one non-black line of video and the blackout period comprising at least one blackout frame; and
      an audio signal comprising a tone interrupted by a mute period synchronized with the blackout period:
   an output for transmitting the synchronization test signal to a broadcast system or network; and
   a detection module for receiving the synchronization test signal from the broadcast system or network and for determining a time differential between the audio signal and the video signal of the synchronization test signal.

10. The system of claim 9, wherein the time differential comprises an induced time differential between the non-black signal and the tone.

11. The system of claim 9, wherein the time differential comprises an induced time differential between the blackout period and the mute period.

12. The system of claim 9, wherein detection module further comprises:
    a video signal detector configured to scan the video signal for the blackout period and identify a time index for the blackout period; and
    an audio signal detector configured to scan the audio signal for the mute period and identify a time index for the mute period, the detection module determining the time differential based on the time index for the blackout period and time index for the mute period.

13. The system of claim 9, further comprising an audio buffer configured to introduce a delay into the audio signal path based on time differential data provided by the detection module based on the determined time differential.

14. The system of claim 9, further comprising a video buffer configured to introduce a delay into a video signal path based on time differential data provided by the detection module based on the determined time differential.

15. A method for measuring an induced time differential between a video signal and an audio signal, comprising:
    generating a synchronization test signal, the synchronization test signal comprising:
        a video signal comprising a non-black signal interrupted by a blackout period, the non-black signal comprising at least one non-black line of video and the blackout period comprising at least one blackout frame; and
        an audio signal comprising a tone interrupted by a mute period synchronized with the blackout period;
    passing the synchronization test signal through a transmission system;
    receiving the synchronization test signal;
    determining the induced time differential by at least one of (i) comparing the relative taming of the blackout period and the mute period in the received synchronization test signal, and (ii) comparing the relative timing of the non-black signal and the tone in the received synchronization test signal.

16. The method of claim 15, further comprising configuring a buffer to introduce a time delay into one of the video signal and the audio signal based on the induced time differential.

17. The method of claim 15, wherein the synchronization test signal is generated such that the blackout period comprises at least one blackout frame that periodically interrupts the non-black signal of the video signal.

18. The method of claim 17, wherein the generating the synchronization signal further comprises inserting the mute period into the audio signal at a time having a known time correlation relative to insertion of the at least one blackout frame into the video signal.

19. The method of claim 17, wherein the generating the synchronization signal further comprises inserting the mute period into the audio signal at a time that corresponds to insertion of the at least one blackout frame into the video signal.

20. The method of claim 15, further comprising:
    configuring a first processor to enter a test mode and generate the synchronization test signal;
    transmitting the synchronization test signal for receipt by a second processor, such that the second processor determines the induced time differential.

\* \* \* \* \*